United States Patent [19]

Sounik et al.

[11] Patent Number: 5,463,141
[45] Date of Patent: Oct. 31, 1995

[54] PROCESS FOR PREPARING POLY(4-HYDROXYSTYRENE)

[75] Inventors: James R. Sounik, Corpus Christi; William W. Wilkison, III, Richardson; Keith M. Russ, Corpus Christi, all of Tex.

[73] Assignee: Hoechst Clanese Corporation, Somerville, N.J.

[21] Appl. No.: 358,431

[22] Filed: Dec. 19, 1994

[51] Int. Cl.⁶ .......................... C07C 39/10; C07C 39/205
[52] U.S. Cl. .......................... 568/763; 568/715; 568/716; 568/780
[58] Field of Search .................... 568/715, 716, 568/763, 780

[56] References Cited

U.S. PATENT DOCUMENTS

| | | | |
|---|---|---|---|
| 3,547,858 | 12/1970 | Worrall et al. | 525/374 |
| 4,544,704 | 10/1985 | Hefner, Jr. | 525/108 |
| 4,678,371 | 8/1987 | Elmore et al. | 525/374 |
| 4,678,843 | 7/1987 | Elmore et al. | 525/374 |
| 4,822,862 | 4/1989 | Elmore | 525/367 |
| 4,857,601 | 8/1989 | Guptz | 525/344 |
| 4,868,256 | 9/1989 | Aslam et al. | 526/75 |
| 4,877,843 | 10/1989 | Gupta | 525/344 |
| 4,898,916 | 2/1990 | Gupta | 525/344 |
| 4,912,173 | 3/1990 | Keene et al. | 525/378 |
| 4,962,147 | 10/1990 | Vicari et al. | 524/460 |
| 4,965,400 | 10/1990 | Vicari et al. | 560/130 |

*Primary Examiner*—Werren B. Lone
*Attorney, Agent, or Firm*—James J. Mullen; Donald R. Cassady

[57] ABSTRACT

The present invention provides a unique and novel way of producing vinyl phenols such as poly(4-hydroxystyrene) (PHS). In this new process, p-α-aminoethylphenol (AEP) is heated under suitable conditions of temperature and pressure and for a sufficient period of time to form the poly(4-hydroxystyrene) (PHS).

17 Claims, No Drawings

1
PROCESS FOR PREPARING POLY(4-HYDROXYSTYRENE)

BACKGROUND OF THE INVENTION

1. Field of the Invention

The present invention relates to a process for the production of poly(4-hydroxystyrene) (PHS) directly from p-α-aminoethylphenol (AEP) ("α" means alpha herein).

2. Description of the Prior Art

In the past, one of the ways of preparing poly(4-hydroxystyrene) (PHS) was the use of 4-hydroxystyrene (HSM) as the starting material; note European Patent Application No. 0-108-624. 4-Hydroxystyrene (HSM) is a well-known compound in the art.

Although there are several known ways to prepare 4-hydroxystyrene, these known methods are not commercially feasible in the further utilization of the 4-hydroxystyrene. The 4-hydroxystyrene itself is difficult to isolate, since it (1) readily decomposes, and (2) is toxic via skin absorption, and, as a result, those skilled in the art have made numerous attempts at finding a method of synthesizing PHS in a manner which avoids using the 4-hydroxystyrene as the starting material.

The following prior art references are disclosed in accordance with the terms of 37 CFR 1.56, 1.97, and 1.93.

U.S. Pat. No. 5,087,772 (issued Feb. 11, 1992) discloses the preparation of HSM by reacting 4-acetoxystyrene (ASM) with a suitable alcohol in the presence of a catalytic amount of a suitable base.

European Patent Application No. 0-128-984 (publication no.), filed Aug. 30, 1983, discloses a process for the production of para-vinyl phenol (HSM) by dehydrogenation of para-ethyl phenol.

European Patent Application No. 0-108-624 (publication no.), filed Nov. 4, 1983, discloses a process for the production of p-vinyl phenol polymer (polyhydroxystyrene polymer-PHS) by polymerizing p-vinyl phenol (HSM) in the presence of water and iron.

U.S. Pat. No. 4,032,513 (issued Jun. 28, 1977) discloses a process of producing PHS by cationically polymerizing HSM in the presence of a nitrile, such as $CH_3CN$, using a cationic polymerization initiator in a homogeneous reaction system.

Other prior art references which relate to the present invention include U.S. Pat. No. 2,276,138; U.S. Pat. No. 3,547,858; U.S. Pat. No. 4,544,704; U.S. Pat. No. 4,678,843; U.S. Pat. No. 4,,689,371; U.S. Pat. No. 4;822,862; U.S. Pat. No. 4,857,601; U.S. Pat. No. 4,868,256; U.S. Pat. No. 4,877,843; U.S. Pat. No. 4,898,916; U.S. Pat. No. 4,912,173; U.S. Pat. No. 4,962,147; and U.S. Pat. No. 4,965,400.

All of the above-cited prior art and any other references mentioned herein are incorporated herein by reference in their entirety.

Additional Background Information

This patent application is assigned to the same assignee of that pending patent application Ser. No. 08/029,200 filed Mar. 10, 1993, entitled "Process for the Preparation of p-α-aminoethylphenol (AEP)" and which is incorporated herein by reference in its entirety.

SUMMARY OF THE INVENTION

The present invention thus provides a unique and novel way of producing vinyl phenol polymers such as p-vinyl phenol polymer poly(4-hydroxystyrene) (PHS). In this new process, the starting material is p-α-aminoethylphenol (AEP) which is heated under suitable polymerization conditions of temperature and pressure and for a sufficient period of time to form the PHS.

DETAILED DESCRIPTION OF THE INVENTION

It has unexpectedly been found that PHS can be prepared by heating AEP, with or without a diluent or solvent, for a sufficient period of time under suitable polymerization conditions.

The process of the present invention is carried out at a reaction temperature of at least 50° C., preferably between 80° C. and 250° C., and more preferably between 90° C. and 200° C. The reaction pressure may be subatmospheric, atmospheric, or superatmospheric.

The length of time which this heating step is conducted is not critical and the only requirement is that the heating be conducted for a period sufficient to form PHS. Generally, this period is at least five minutes and may be as long as 25 hours.

Diluents/solvents which can be used in the present invention include: (a) water; (b) hydrocarbons such as benzene, toluene, xylene, and low-boiling point petroleum fractions; (c) inorganic gases such as carbon monoxide, carbon dioxide, nitrogen, helium, and argon; (d) dipolar aprotic solvents; (e) halogenated hydrocarbons such as chloroform, trichloroethane, or chlorobenzene, etc.; (f) carbon tetrachloride; and (g) mixtures thereof. The dipolar aprotic solvents employed are solvents which have a high dielectric constant and a high dipole moment but no acid hydrogen atoms; for example, such solvents include dimethylsulfoxide (DMSO), acetonitrile, dimethylformamide (DMF), dimethylacetamide, hexamethylphosphoric acid triamide (HMPT), and n-methyl pyrrolidone (NMP). Water, benzene, and toluene are preferred diluents. The diluents are used in an amount of 2 to 200 mols, preferably 3 to 20 mols per mol of AEP. It is to be understood that any diluent may be used under any temperature and reaction conditions so long as the polymerization of AEP is effected smoothly.

In carrying out the present invention, the amount of water, if present, in the reaction system is generally used in a range of 10 to 300% by weight, preferably 20 to 200% by weight, and more preferably, 50 to 100% by weight, based on the amount of the p-α-aminoethylphenol.

It is also within the scope of the present invention to employ polymerization inhibitors or accelerators in order to facilitate the reaction. Any substance may be used as the polymerization accelerator in the present invention if it accelerates or initiates polymerization of AEP. For example, it is possible to use various polymerization accelerators described in Japanese Patent Publication (examined) Nos. 30123/82 and 47921/82 and Japanese Patent Publication (unexamined) Nos. 44607/82, 44608/82, and 44609/82, etc., all of which are incorporated herein by reference in their entirety.

Specific examples of the polymerization accelerators useful in the present invention include (1) cation initiators, e.g., (a) inorganic acids such as sulfuric acid, hydrochloric acid, nitric acid, or phosphoric acid, etc.; (b) metal halides such as aluminum chloride, tin tetrachloride, iron chloride, vanadium oxychloride, or boron trifluoride, etc.; (c) complexes such as ether complex of boron trifluoride or phenol complex of boron trifluoride, etc.; (d) aliphatic saturated monocarboxylic acids such as formic acid, acetic acid, chloroacetic acid, dichloroacetic acid, trichloroacetic acid, fluoroacetic acid, bromoacetic acid, idoacetic acid, oxyacetic acid, methoxyacetic acid, mercaptoacetic acid, cyanoacetic acid, propionic acid, 2-oxypropionic acid, n-butyric acid, isobutyric acid, n-valeric acid, isovaleric acid, 4-keto-n-valeric acid, methylethylacetic acid, trimethylacetic acid, caproic acid, heptoic acid, caprylic acid, pelargonic acid, or capric acid, etc.; (e) aliphatic saturated polycarboxylic acids such as oxalic acid, malonic acid, succinic acid, glutaric acid, adipic acid, pimelic acid, tartaric acid, or citric acid, etc.; (f) aliphatic unsaturated monocarboxylic acids such as acrylic acid, crotonic acid, or methacrylic acid, etc.; (g) aliphatic unsaturated polycarboxylic acids such as maleic acid or fumaric acid, etc.; (h) aromatic carboxylic acids such as benzoic acid, hydroxybenzoic acid, methoxybenzoic acid, chlorobenzoic acid, bromobenzoic acid, iodobenzoic acid, cinnamic acid, salicylic acid, toluic acid, phthalic acid, isophthalic acid, terephthalic acid, trimellitic acid, or pyromellitic acid, etc.; or (i) organic sulfonic acids such as methanesulfonic acid; ethanesulfonic acid, benzenesulfonic acid or toluenesulfonic acid, etc.; and (2) radical initiators, e.g., azoisobutyronitrile, benzoyl peroxide, or ammonium persulfate, etc.

Phenol complex of boron trifluoride, sulfuric acid, hydrochloric acid, oxalic acid, chloroacetic acid, bromoacetic acid, benzenesulfonic acid, and toluenesulfonic acid are preferred polymerization accelerators.

The amount of these polymerization accelerators used varies according to the kind thereof, reacting conditions to be adopted and desired molecular weight of the polymer, etc. However, the amount is generally preferred to be in the range of 0.005 to 10% by weight based on the amount of the AEP.

It is also within the scope of the present invention processes to use a catalyst in order to further facilitate the polymerization reaction. Such catalysts include, without limitation, acids and bases such as $H_2SO_4$, $H_3PO_4$, NaOH, etc. The amount of catalyst employed is any amount which will facilitate the reaction. Such amount will generally be from about 0.001% by weight to about 2.0% by weight based on the total weight of AEP employed.

After the polymerization of AEP, the end product (PHS) is recovered from the reaction product and the residual fraction containing any unreacted AEP can be recycled as the starting material for the next cycle. The end product (PHS) may be recovered from the reaction product by any method; for example, it can be separated from the fraction containing the unreacted AEP by filtration or any other suitable technique.

The following specific example is supplied for the purpose of better illustrating the invention. This example is not intended, however, to limit or restrict the scope of the invention in any way and should not be construed as providing conditions, parameters, or values which must be utilized exclusively in order to practice the present invention.

EXAMPLE 1–8

Preparation of Poly(4-Hydroxystyrene) from α-Aminoethylphenol

EXAMPLE 1

A 250 ml three neck flask was fitted with a thermowell, mechanical stirrer, and a condenser. To the flask was added α-aminoethylphenol (10.2 g, 0.07 mole) and water (31.2 g) and the mixture was thoroughly purged with nitrogen. The mixture was heated to 98° C. for three hours. During this time, ammonia was released from the mixture. The suspension was cooled to room temperature and the water layer was removed by decanting. The solid was dissolved in methanol (30 ml) and then precipitated into acetic acid/water (0.1% by weight, 400 ml). The solid was isolated by filtration and the solid was washed with water (100 ml), dried (60° C., 100 torr.), and weighed (5.3 g, 0.05 moles, 59%).

The poly(hydroxystyrene) obtained was soluble in polar organic solvents such as acetone, methanol, tetrahydrofuran, etc. The mean molecular weight and the number means molecular weight of the polymer, as measured by gel permeation chromatography as compared to polystyrene standards, was 1174 and 506 respectively, and the polydispersity was 2.32.

EXAMPLE 2

The same procedure as in Example 1 except stearic acid (1.0 g) was used as a suspension aid with α-aminoethylphenol (20.4 g, 0.15 moles) and water (60.9 g). The polymer was isolated in a similar manner giving a yield of 81%, a mean molecular weight of 1224, a number mean molecular weight of 816, and a polydispersity of 1.50.

EXAMPLE 3

A 250 ml three neck flask was fitted with a thermowell, mechanical stirrer, and a condenser. To the flask was added α-aminoethylphenol (49.5 g, 0.36 moles) and the flask was thoroughly purged with nitrogen. The solid was heated to 200° C. for 2.5 hours. During this time, the solid became a melt and ammonia was released. The melt solidified upon cooling to room temperature, and the solid was dissolved in methanol (150 g). The solid was precipi-tated into acetic acid/water (0.1% by weight, 850 ml). The solid was isolated by filtration and the solid was washed with water (100 ml), dried (60° C., 100 tort.), and weighed (28.1 g, 0.23 moles, 65%).

The poly(hydroxystyrene obtained was soluble in polar organic solvents such as acetone methanol, tetrahydrofuran, etc. The mean molecular weight was 1575 and the number mean molecular weight was 1053, and the polydispersity was 1.50 respectively.

EXAMPLE 4

To a 100 cc autoclave, α-aminoethylphenol (10.0 g, 0.07 moles) and water (25.1 g) were added. The reactor was thoroughly purged with nitrogen. The mixture was heated to 150° C. for 22.8 hours. The maximum pressure attained during this time was 205 psi. The reactor was cooled to 60° C., vented, and purged with nitrogen. The liquid layer was decanted and the remaining solid was dissolved in methanol (40 g). The solution was then precipitated into acetic acid/water (0.1% by weight, 400 ml). The solid was isolated by filtration and washed with water (100 ml), dried (60° C., 100 tort.), and weighed (6.7 g, 0.06 moles, 76%).

The poly(hydroxystyrene) obtained was soluble in polar organic solvents such as acetone, methanol, tetrahydrofuran, etc. The mean molecular weight was 8788 and the number mean molecular weight was 2964, and the polydispersity was 2.96 respectively.

EXAMPLE 5

The same procedure as in Example 4 except phosphoric acid (4.0 g), was used as a suspension aid, with α-aminoethylphenol (10.0 g, 0.07 moles), and water (25.6 g), and the reaction time was 6.5 hours. The maximum pressure attained during this time was 175 psi. The polymer was isolated in a similar manner giving a yield of 81%, a mean molecular weight of 3324, a number mean molecular weight of 1819, and a polydispersity of 1.83.

EXAMPLE 6

The same procedure as in Example 4 except stearic acid (1.0 g) was used as a suspension aid, with α-aminoethylphenol (19.9 g, 0.15 moles), and water (50.5 g), and the reaction time was 16.5 hours. The maximum pressure attained during this time was 205 psi. The polymer was isolated in a similar manner giving a yield of 90%, a mean molecular weight of 4276, a number mean molecular weight of 1801, and a polydispersity of 2.37.

EXAMPLE 7

The same procedure as in Example 4 except methanol (7.6 g) was used as a suspension aid, with α-aminoethylphenol (9.9 g, 0.07 moles) and water (17.7 g), and the reaction time was 24 hours. The maximum pressure attained during this time was 285 psi. The polymer as isolated in a similar manner giving a yield of 81%, a mean molecular weight of 4530, a number mean molecular weight of 1915, and a polydispersity of 2.37.

EXAMPLE 8

The same procedure as in Example 4 except methanol (7.6 g) and poly(acrylic acid) (1.0 g) were used as suspension aids, with α-aminoethylphenol (10.0 g, 0.07 moles), and water (17.7 g), and the reaction time was 15.5 hours. The maximum pressure attained during this time was 230 psi. The polymer was isolated in a similar manner giving a yield of 55%, a mean molecular weight of 4215, a number mean molecular weight of 1882, and a polydispersity of 2.40.

While the above has been described using p-α-aminoethylphenol (AEP) as the starting material, it is also within the scope of the present invention to use (1) other aminoethylphenols (wherein the aminoethyl and the hydroxy substituents are positioned at different locations on the phenyl ring), and (2) substituted aminoethylphenols wherein the remaining four hydrogen atoms are selectively replaced by an R group, said R being selected from the group consisting of (a) $C_1$–$C_8$ alkyl; (b) $C_6H_5$; (c) halogen (F, Cl, Br, I); (d) hydroxy; and (e) OR where R is the same as defined above. These aminoethylphenols and substituted aminoethylphenols are all suitable starting materials for use in the present invention process.

Although the invention has been illustrated by the preceding example, it is not to be construed s being limited thereby; but rather, the invention encompasses the generic area as hereinbefore disclosed. Various modifications and embodiments can be made without departing from the spirit and scope thereof.

What is claimed is:

1. A process for preparing polyhydroxystyrene which comprises the step of heating p-α-aminoethylphenol under suitable conditions of temperature and pressure and for a sufficient period of time to form said polyhydroxystyrene.

2. The process as set forth in claim 1 wherein the temperature is at least about 50° C.

3. The process as set forth in claim 1 wherein the reaction takes place in the presence of an organic solvent.

4. The process as set forth in claim 1 wherein the reaction takes place in the presence of water.

5. The process as set forth in claim 1 wherein the reaction takes place in the presence of a solvent which is a mixture of an organic solvent and water.

6. The process as set forth in claim 4 wherein the reaction takes place in the presence of an initiator.

7. The process as set forth in claim 6 wherein the reaction takes place in the presence of a catalyst.

8. The process as set forth in claim 7 wherein the reaction takes place in the presence of a suspension aid.

9. A process for the production of p-vinylphenol polymer which comprises polymerizing p-α-aminoethylphenol in the presence of a polymerization accelerator; wherein said polymerization is additionally carried out in the presence of water.

10. A process as set forth in claim 1 wherein the amount of water present is 10 to 300% by weight based on the amount of p-α-aminoethylphenol.

11. A process as set forth in claim 9 wherein the polymerization accelerator is selected from the group consisting of at lest one cationic initiator selected from inorganic acids, metal halides, complexes of boron trifluoride, aliphatic saturated monocarboxylic acids, aliphatic saturated polycarboxylic acids, aliphatic unsaturated monocarboxylic acids, aliphatic unsaturated polycarboxylic acids, aromatic carboxylic acids, and organic sulfonic acids.

12. A process as set forth in claim 9 wherein the polymerization accelerator is selected from the group consisting of at least one radical initiator selected from azoisobutyronitrile, benzoyl peroxide, and ammonium persulfate.

13. A process as set forth in claim 12 wherein the amount of the polymerization accelerator present is from about 0.005 to about 10% by weight based on the amount of p-α-aminoethylphenol.

14. A process as set forth in claim 13 wherein the polymerization reaction temperature is from about 0° C. to about 200° C.

15. The process as set forth in claim 1 wherein an aminoethylphenol is substituted for p-α-aminoethylphenol.

16. The process as set forth in claim 1 wherein a substituted aminoethylphenol is substituted for p-α-aminoethylphenol.

17. A process for preparing a polyhydroxystyrene which comprises the step of heating a substituted aminoethylphenol under suitable conditions of temperature and pressure and for a sufficient period of time to form said polyhydroxystyrene.

* * * * *